United States Patent [19]

Marinaro

[11] Patent Number: 5,713,617
[45] Date of Patent: Feb. 3, 1998

[54] COMBINATION POLE FOR HANGING DECORATIVE LIGHTS AND WINDOW WASHING

[76] Inventor: Anthony A. Marinaro, 3401 W. 114th Cir. #F, Westminster, Colo. 80030

[21] Appl. No.: 651,782

[22] Filed: May 24, 1996

[51] Int. Cl.⁶ ........................................ B25J 1/04
[52] U.S. Cl. .................. 294/24; 294/19.1; 15/105; 15/144.4
[58] Field of Search ................... 294/1.1, 2, 19.1, 294/22-24; 15/105, 117, 121, 144.4; 7/105

[56] References Cited

U.S. PATENT DOCUMENTS

| | | | |
|---|---|---|---|
| 366,369 | 7/1887 | Bierman | 294/33 |
| 678,898 | 7/1901 | O'Carroll | 294/22 |
| 2,739,330 | 3/1956 | Hitchcock | 294/24 |
| 4,059,864 | 11/1977 | Spresny | 15/105 |
| 5,156,428 | 10/1992 | Wright | 294/24 |
| 5,553,905 | 9/1996 | Bentivegna | 294/19.1 |
| 5,560,975 | 10/1996 | Casper | 294/19.1 |
| 5,601,322 | 2/1997 | Forest | 15/105 |

*Primary Examiner*—Dean Kramer
*Attorney, Agent, or Firm*—Edwin H. Crabtree; Donald W. Margolis; Ramon L. Pizarro

[57] ABSTRACT

A combination pole for hanging decorative lights and window washing. The pole can be used for hanging and removing lights suspended from high trees and on the sides of a building structure. The pole can also be used for washing and cleaning windows that are difficult to reach by hand or with a ladder. The pole includes a hollow stationary pole member having a first end and a second end. The second end includes a threaded locking collar for engaging a first end of a telescoping pole member. The telescoping pole member is slidably receiving inside the stationary pole member when retracted therein. When the telescoping pole member is extended outwardly from the stationary pole member and tightened thereon, a second end of the telescoping pole member has a finger switch. When the finger switch is moved outwardly on the second end of the telescoping pole member a pair of parallel wire fingers move outwardly from the second end and are used for receiving a portion of a light cord therebetween. When the combination pole is used for window washing, the finger switch is moved inwardly and the fingers are retracted inside in the second end of the telescoping pole member and a threaded adapter is used to receive a washing sponge and squeegee connector thereon. The sponge is used for washing a window and the squeegee is used for removing washing liquid from the window.

15 Claims, 1 Drawing Sheet

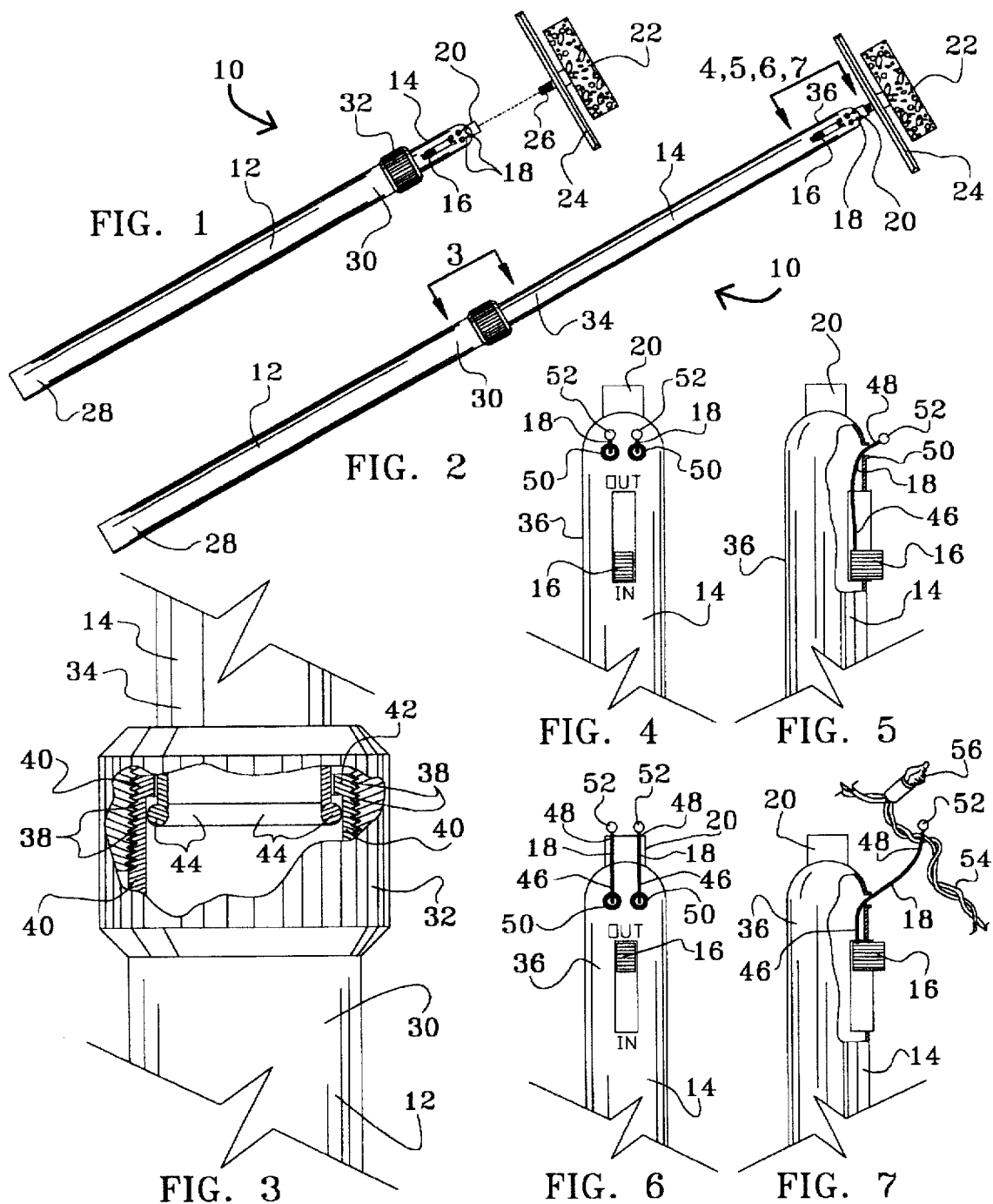

COMBINATION POLE FOR HANGING DECORATIVE LIGHTS AND WINDOW WASHING

BACKGROUND OF THE INVENTION (a) Field of the Invention

This invention relates to a device for hanging lights and washing windows and more particularly, but not by way of limitation, to a combination pole which can be used both for hanging and removing light cords and for washing and cleaning windows.

(b) Discussion of Prior Art

Heretofore there have been a variety of individual types of window washing devices. For example, in U.S. Pat. No. 430,047 to Tylee, U.S. Pat. No. 539,313 to Thierry et al., U.S. Pat. No. 556,722 to Ford, U.S. Pat. No. 832,475 to George and U.S. Pat. No. 1,218,040 to Armstrong various types of window cleaning devices are disclosed. These patents describe the use of elongated poles having one end attached to a garden hose with the other end having different kinds of window brushes. Also, U.S. Pat. No. 1,117,513 to North describes a cleaning implement with an elongated pole, water nozzle and a squeegee type window cleaning device. Further, in U.S. Pat. No. 906,415 to Hallgren and U.S. Pat. No. 4,230,357 to Bosch et al. the use of poles for gripping a curtain rod and a tool for manually shifting and manipulating electrical cables are described.

None of the above mentioned patents specifically disclose or teach the unique combination of structure and function of the subject combination pole which can be used for the variety of purposes as described herein.

SUMMARY OF THE INVENTION

In view of the foregoing, it is a primary object of the present invention to provide a telescoping combination pole which can reach high places for hanging and removing decorative lights by griping the light cord.

Another object of the invention is the combination pole can be used for washing and cleaning windows. The end of the pole includes a threaded adapter for mounting a sponge and squeegee connecter. The sponge can be used for washing the window and the squeegee for removing the excess window cleaner.

The subject invention includes a hollow stationary pole member having a first end and a second end. The second end includes a threaded locking collar for engaging a first end of a telescoping pole member. The telescoping pole member is slidably receiving inside the stationary pole member when retracted therein. When the telescoping pole member is extended outwardly from the stationary pole member and tightened thereon, a second end of the telescoping pole member has a finger switch. When the finger switch is moved outwardly on the second end of the telescoping pole member a pair of parallel wire fingers move outwardly from the second end and are used for receiving a portion of a light cord therebetween. When the pole is used for window washing, the finger switch is moved inwardly and the fingers are retracted inside in the second end of the telescoping pole member and a threaded adapter is used to receive a washing sponge and squeegee connector thereon. The sponge is used for washing a window and the squeegee is used for removing washing liquid from the window.

These and other objects of the present invention will become apparent to those familiar with different types of window cleaning devices and poles used for hanging and changing lights when reviewing the following detailed description, showing novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 1 is a front view of the combination pole with the telescoping pole member slidably received inside the stationary pole member and the sponge and squeegee connector positioned for attachment on the end of the telescoping pole member.

FIG. 2 is another front view of the combination pole with the telescoping pole member extended outwardly from the stationary pole member and the sponge and squeegee connector attached to a threaded adapter on the end of the telescoping pole member.

FIG. 3 is an enlarged view of a locking collar taken along arrow 3 shown in FIG. 2 with a portion of the collar cut away.

FIGS. 4 and 5 illustrate a front and side view of the finger switch in a retracted position with the parallel gripping fingers received inside the second end of the telescoping pole member.

FIGS. 6 and 7 illustrate a front and side view of the finger switch in an extended position with the gripping fingers extending outwardly from the end of the telescoping pole member. FIG. 7 shows the finger engaging a portion of a light cord.

DESCRIPTION OF THE PREFERRED EMBODIMENTS

In FIG. 1, the subject combination pole is shown in a retracted position and designated by general reference numeral 10. Broadly the combination pole 10 includes a hollow stationary pole member 12, a telescoping pole member 14, a finger switch 16 with a pair of parallel wire fingers 18 and a threaded adapter 20 for receiving a sponge 22 and squeegee 24 mounted on a sponge and squeegee connector 26. The stationary pole member 12 includes a first end 28 and a second end 30. The second end 30 is threaded for receiving a threaded locking collar 32. The telescoping pole member 14 includes a first end 34 and a second end 36. The locking collar 32 is used to secure the first end 34 of the telescoping pole member 14 to the second end 30 of the stationary pole member 12 in an extended position as shown in FIG. 2. In FIG. 1 the sponge and squeegee connector 26 is shown in position for threaded connection to the adapter 20.

In FIG. 2, the combination pole 10 is shown in an extended position with the sponge and squeegee connector 26 threaded on the threaded adapter 20 and ready for use in washing and cleaning windows or other hard to reach items needing washing. The sponge 22 is used for washing windows and the like and the squeegee 24 is used for removing excess liquid from the window surface. In both FIGS. 1 and 2, the finger switch 16 is shown in an "in" position with the fingers 18 in a retracted position inside the second end 36 of the telescoping pole member 14.

In FIG. 3, an enlarged view of the locking collar 32 is shown taken along arrow 3 shown in FIG. 2. In this view a portion of the locking collar has been cut away to expose internal threads 38 of the collar 32 threaded on a threaded end portion 40 of the second end 30 of the stationary pole member 12. As the threads 38 are tightened on the threaded end portion 40, an end ring 42 of the stationary pole member 12 is compressed against the sides of the telescoping pole member 14. When the locking collar 32 is loosened on the second end 30 of the stationary pole member 12, the telescoping pole member 14 is free to slide in and out of the hollow stationary pole member 12. The telescoping pole member 14 includes a retainer ring 44 mounted on the first end 34 of the member 14 to prevent the telescoping pole member 14 from coming loose from the stationary pole member 12. The pole members 12 and 14 may be of various lengths up to and greater than 5 feet in length. Also, the telescoping pole member 14 may be extended to various lengths on the stationary pole member 12 and tightened thereon using the locking collar 32.

In FIGS. 4 and 5, a front and side view of the second end 36 of the telescoping pole member 14 is shown and taken along arrow 4 and 5 shown in FIG. 2. In these two views the finger switch 16 is in an "in" position with the fingers 18 in a retracted position inside the second end 36. One end 46 of the fingers 18 is attached to the finger switch 16 with an opposite end 48 received through a pair of eyelets 50 in the second end 36 of the telescoping pole member 14. The opposite ends 48 of the fingers 18 include round stops 52 to prevent the fingers 18 from being completed inserted inside the second end 36.

In FIGS. 6 and 7, the fingers 18 are shown in an extended position with the finger switch 16 in an "out" position. In FIG. 7, a portion of a light cord 54 with light 56 thereon is shown. The light cord 54 is gripped between the two fingers 18 and below the round stops 52. In this manner, the light cord 54 can be suspended and removed from the top of high trees and difficult to reach building structures. By using the subject combination pole 10 lights can be suspended and removed from high places and windows and other difficult to reach items can be washed and cleaned without the safety risk of using a ladder or foot stool.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A combination pole for hanging and removing decorative lights on a light cord and window washing using a sponge and squeegee connector, the combination pole comprising:

a first pole member having a first end and a second end;

a second pole member having a first end and a second end: the first end of said second pole member attached to the second end of said first pole member;

gripping means mounted on the second end of said second pole member and adapted for releasably engaging a portion of the light cord; and a threaded adapter mounted on an end portion of the second end of said second pole member, said threaded adapter adapted for receiving the sponge and squeegee connector thereon.

2. The combination pole as described in claim 1 wherein said gripping means is a pair of parallel fingers adapted for receiving a portion of the light cord therebetween.

3. The combination pole as described in claim 2 wherein one end of said fingers are attached to a finger switch mounted in the second end of said second pole member, said finger switch used for extending and retracting said fingers on said second pole member.

4. The combination pole as described in claim 1 wherein said second pole member is slidably received inside said first pole member and telescopes outwardly therefrom.

5. A combination pole for hanging and removing decorative lights on a light cord and for window washing, the combination pole comprising:

a first hollow stationary pole member having a first end and a second end;

a second telescoping pole member slidably received in said first pole member and having a first end and a second end, the first end releasably attached to the second end of said first pole member;

gripping means mounted on the second end of said second pole member for releasably engaging a portion of the light cord; and an adapter for attaching a sponge and squeegee connector, said connector having a sponge and squeegee mounted thereon for washing and cleaning windows.

6. The combination pole as described in claim 5 wherein said gripping means is a pair of parallel fingers attached to a finger switch mounted in the second end of said second pole member, said finger switch used for extending said fingers outwardly from said second pole member and retracting said fingers inside said second pole member.

7. The combination pole as described in claim 6 wherein said fingers include round stops mounted thereon to prevent the fingers from being fully retracted inside said second pole member.

8. The combination pole as described in claim 6 wherein said fingers are received through a pair of eyelets in the second end of said second pole member.

9. The combination pole as described in claim 5 wherein said second pole member is secured to said first pole member using a locking collar threadably mounted on the second end of said first pole member.

10. A combination pole for hanging and removing decorative lights on a light cord and for window washing, the combination pole comprising:

a first hollow stationary pole member having a first end and a second end;

a second telescoping pole member slidably received in said first pole member and having a first end and a second end, the first end of said second pole member releasably attached to the second end of said first pole member;

finger means mounted on the second end of said second pole member for releasably engaging a portion of the light cord; and an adapter for attaching a sponge and squeegee connector, said connector having a sponge and squeegee mounted thereon for washing and cleaning windows.

11. The combination pole as described in claim 10 wherein said finger means is a pair of parallel fingers mounted in the second end of said second pole member.

12. The combination pole as described in claim 11 further including a finger switch attached to said fingers, said finger switch used for extending said fingers outwardly from said second pole member and retracting said fingers inside said second pole member.

13. The combination pole as described in claim 12 wherein said fingers include round stops mounted thereon to prevent the fingers from being fully retracted inside said second pole member.

14. The combination pole as described in claim 12 wherein said fingers are received through a pair of eyelets in the second end of said second pole member.

15. The combination pole as described in claim 10 wherein said second pole member is secured to said first pole member using a locking collar threadably mounted on the second end of said first pole member.

\* \* \* \* \*